United States Patent
Takahashi et al.

(10) Patent No.: US 12,508,028 B2
(45) Date of Patent: Dec. 30, 2025

(54) SURGICAL INSTRUMENT AND SURGERY ASSIST ROBOT

(71) Applicant: MEDICAROID CORPORATION, Kobe (JP)

(72) Inventors: Kaoru Takahashi, Kobe (JP); Gen Kurihara, Tokyo (JP)

(73) Assignee: MEDICAROID CORPORATION, Kobe (JP)

( * ) Notice: Subject to any disclaimer, the term of this patent is extended or adjusted under 35 U.S.C. 154(b) by 320 days.

(21) Appl. No.: 18/339,129

(22) Filed: Jun. 21, 2023

(65) Prior Publication Data
US 2024/0032923 A1  Feb. 1, 2024

(30) Foreign Application Priority Data

Jul. 28, 2022 (JP) ................. 2022-120747

(51) Int. Cl.
*A61B 17/10* (2006.01)
*A61B 34/30* (2016.01)

(52) U.S. Cl.
CPC ............. *A61B 17/10* (2013.01); *A61B 34/30* (2016.02)

(58) Field of Classification Search
CPC .......... A61B 17/10; A61B 17/122; A61B 17/1285; A61B 2017/00477; A61B 34/30
See application file for complete search history.

(56) References Cited

U.S. PATENT DOCUMENTS

| | | | |
|---|---|---|---|
| 3,631,707 A * | 1/1972 | Miller | A61B 17/122 606/142 |
| 6,206,903 B1 * | 3/2001 | Ramans | A61B 17/29 606/205 |
| 6,394,998 B1 | 5/2002 | Wallace et al. | |
| 6,936,042 B2 | 8/2005 | Wallace et al. | |
| 10,675,031 B2 | 6/2020 | Stokes et al. | |
| 10,675,108 B2 | 6/2020 | Stokes et al. | |
| 10,932,792 B2 | 3/2021 | Stokes et al. | |
| 2014/0039524 A1 | 2/2014 | Schulz et al. | |
| 2019/0046200 A1 | 2/2019 | Stokes et al. | |
| 2021/0401438 A1 | 12/2021 | Pilletere et al. | |

FOREIGN PATENT DOCUMENTS

JP  2014-516278 A  7/2014

* cited by examiner

*Primary Examiner* — Mohamed G Gabr
*Assistant Examiner* — Khoa Tan Le
(74) *Attorney, Agent, or Firm* — METROLEX IP LAW GROUP, PLLC; Robert L. Scott, Esq.

(57) ABSTRACT

A surgical instrument according to one or more embodiments may include: a base to be attached to a robot arm; a shaft including one end connected to the base; and a pair of jaw members provided to the other end of the shaft and provided to be rotatable about a first rotation axis so as to be opened and closed to each other, wherein opposing surfaces of the pair of jaw members include groove-shaped recesses, respectively, to hold a clip, and the recess of each of the jaw members includes a first section provided on a side of a distal end of the jaw member and having a first depth and a second section provided on a side of a first rotation axis of the jaw member with respect to the first section and having a second depth greater than the first depth.

17 Claims, 10 Drawing Sheets

SURGICAL INSTRUMENT AND SURGERY ASSIST ROBOT

CROSS REFERENCE TO RELATED APPLICATIONS

This application claims priority based on 35 USC 119 from prior Japanese Patent Application No. JP2022-120747 filed on Jul. 28, 2022, entitled "SURGICAL INSTRUMENT AND SURGERY ASIST ROBOT", the entire contents of which are incorporated herein by reference.

BACKGROUND

The disclosure may relate to a surgical instrument and a surgery assist robot.

In a related art, there has been known a surgical instrument that is to be attached to a robot arm. For example, Patent Document 1 (U.S. Pat. No. 6,206,903) discloses a surgical instrument that includes a base to be attached to a robot arm, a shaft including one end connected to the base, and a pair of jaw members provided to the other end of the shaft and rotatable about a rotation axis thereof to open and close to each other. Opposing faces of the pair of jaw members of the surgical instrument are provided with groove-shaped recesses of uniform depth, respectively, to hold a clip.

Patent Document 1: U.S. Pat. No. 6,206,903

SUMMARY

As described above, the surgical instrument disclosed in Patent Document 1 includes the groove-shaped recesses having the uniform depth respectively provided on the opposed faces of the pair of jaw members, in order to hold the clip. A length of the jaw members is set to be short so that the handleability of the surgical instrument attached to the robot arm is not deteriorated. Accordingly, since the jaw member is short, a length between a rotation axis of the jaw member and a distal end of the jaw member is short. With this, when opening or closing the distal ends of the jaw members by a predetermined distance, an opening or closing angle of the jaw members is larger than the case where the jaw members are long. Therefore, when closing the jaw members to collapse the clip, it may be necessary to change the angle of the jaw members significantly. That is, in comparison with the case where the jaw members are long, it may be difficult to close the jaw members at an angle where the jaw members are nearly parallel to each other. As a result, when collapsing the clip by closing the pair of jaw members, it may be difficult to collapse the clip in parallel entirely from distal ends of the clip to a folded portion of the clip. For this reason, upon closing the pair of jaw members while greatly changing the rotation angle, the folded portion of the collapsed clip interferes, at a stage where the jaw members is closed at a certain angle, with portions of the jaw members on a side of the rotation axis of the jaw members. Such an interference may hinder the closing of the pair of jaw members, and thus it may be difficult to further close the pair of jaw members. That is, it may be difficult to close the clip securely.

An object of one or more embodiments of the disclosure may be to provide a surgical instrument and a surgery assist robot that are capable of closing a clip securely by the surgical instrument attached to a robot arm.

A first aspect of one or more embodiments of the disclosure may be a surgical instrument that may include: a base to be attached to a robot arm; a shaft including one end connected to the base; and a pair of jaw members provided to the other end of the shaft and provided to be rotatable about a first rotation axis so as to be opened and closed to each other. Opposing surfaces of the pair of jaw members include groove-shaped recesses, respectively, to hold a clip. The recess of each of the jaw members includes a first section provided on a side of a distal end of the jaw member and having a first depth and a second section provided on a side of a first rotation axis of the jaw member with respect to the first section and having a second depth greater than the first depth.

According to the first aspect described above, the recess of the jaw member includes the first section provided on the distal end side of the jaw member and having the first depth and the second section provided on the side of the rotation axis of the jaw member with respect to the first section and having the second depth greater than the first depth. With this configuration, upon closing the pair of jaw members to collapse the clip, a folded portion of the collapsed clip near the rotation axis can be escaped to the second section having the second depth larger than the first depth. Accordingly, it is possible to suppress the folded portion of the clip from hindering further closing of the pair of jaw members. Therefore, the jaw members can be further closed, so that the clip can be securely closed by the surgical instrument attached to the robot arm. Further, the clip can be easily collapsed thoroughly by the surgical instrument attached to the robotic arm.

A second aspect of the disclosure may be a surgery assist robot that may include: a robot arm; and a surgical instrument to be attached to the robot arm. The surgical instrument may include a base attached to a robot arm, a shaft including one end attached to the base, and a pair of jaw members provided to the other end of the shaft and being rotatable about a rotation axis thereof to open and close to each other. Opposing surfaces of the pair of jaw members include groove-shaped recesses, respectively, to hold a clip. The groove-shaped recess of each of the jaw members includes a first section provided on a side of a distal end of the jaw member and having a first depth and a second section provided on a side of a rotation axis of the jaw member with respect to the first section and having a second depth greater than the first depth.

According to the second aspect described above, the recess of the jaw member includes the first section provided on the side of the distal end of the jaw member and having the first depth and the second section provided on the side of the rotation axis of the jaw member with respect to the first section and having the second depth greater than the first depth. With this configuration, upon closing the pair of jaw members to collapse the clip, a folded portion of the collapsed clip near the rotation axis can be escaped to the second section having the second depth larger than the first depth. Accordingly, it is possible to suppress the folded portion of the clip from hindering further closing of the pair of jaw members. Accordingly, the jaw members can be further closed, so that the clip can be securely closed by the surgical instrument attached to the robot arm. Therefore, it is possible to provide the surgery assist robot capable of securely close the clip by the surgical instrument attached to the robot arm. Further, the surgical instrument attached to the robotic arm can easily collapse the clip thoroughly.

According to at least one of the aspects described above, it is possible to collapse the clip entirely by the surgical instrument attached to the robotic arm.

DETAILED DESCRIPTION

Descriptions are provided hereinbelow for one or more embodiments of the disclosure based on the drawings. In the respective drawings referenced herein, the same constituents are designated by the same reference numerals and duplicate explanation concerning the same constituents is omitted. All of the drawings are provided to illustrate the respective examples only.

A configuration of a surgical system 100 according to one or more embodiments is described with reference to FIGS. 1 to 13. The surgical system 100 includes a medical manipulator 1 serving as a patient-side apparatus and a remote control apparatus 2 serving as an operator-side apparatus to operate the medical manipulator 1. The medical manipulator 1 is provided with a medical trolley 3 and is thus configured to be movable. The remote control apparatus 2 is provided at a location away from the medical manipulator 1. The medical manipulator 1 is configured to be remotely operated by the remote control apparatus 2. An operator or a surgeon inputs to the remote control apparatus 2 a command (an instruction) that causes the medical manipulator 1 to perform a desired operation. The remote control apparatus 2 transmits the inputted command to the medical manipulator 1. The medical manipulator 1 operates in response to the received command. The medical manipulator 1 is disposed in a surgery room, as a sterile field, which is sterilized. Note that the medical manipulator 1 is an example of a surgery assist robot.

Figure 1:
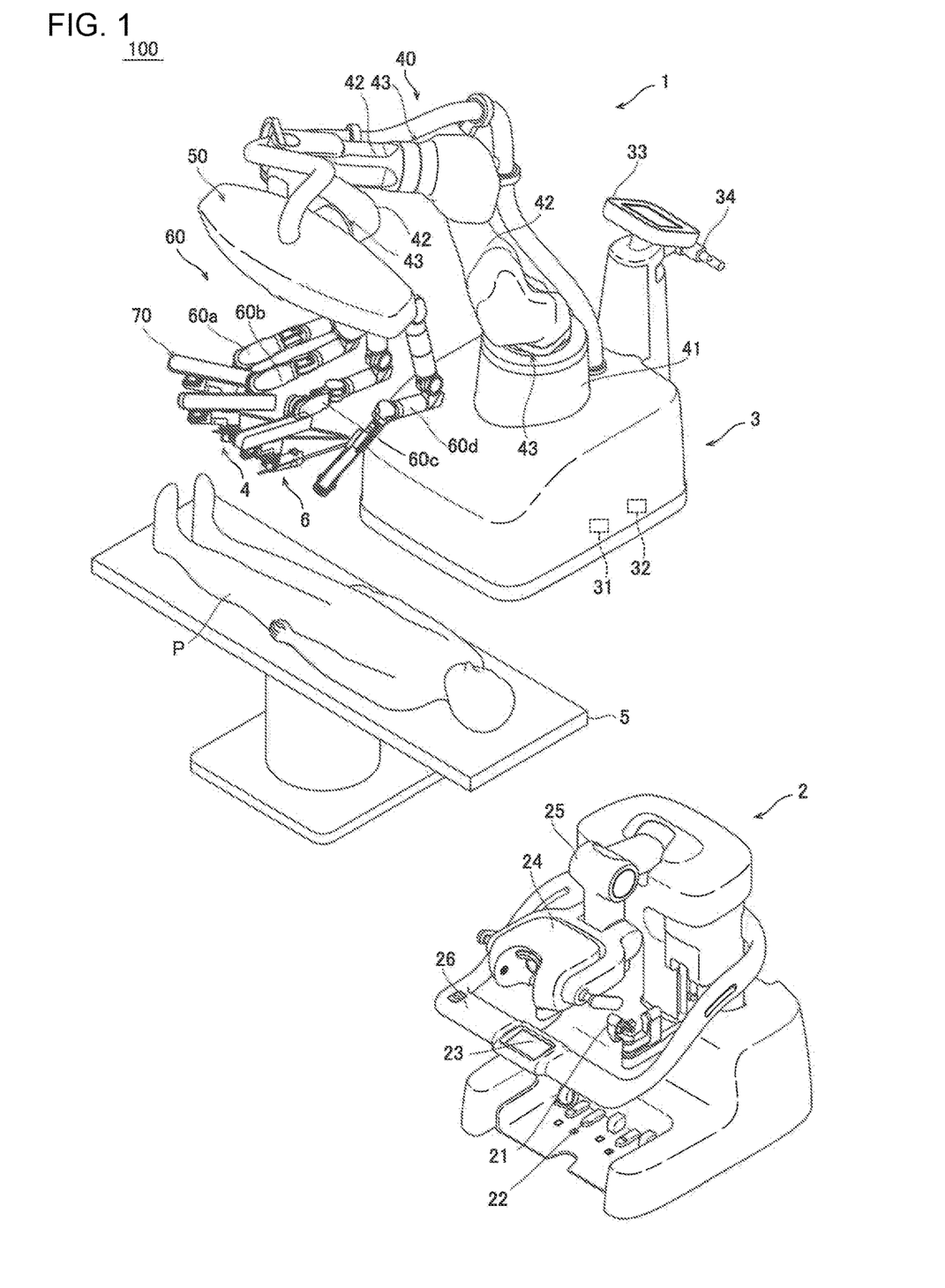
FIG. 1 is a diagram illustrating a view of a configuration of a surgical system according to an embodiment.

The remote control apparatus 2 is disposed inside the surgery room or outside the surgery room, for example. The remote control apparatus 2 includes operation manipulator arms 21, operation pedals 22, a touch panel 23, a monitor 24, a support arm 25, and a support bar 26. The manipulator arms 21 constitute operation handles for the operator to input the command. Specifically, the manipulator arms 21 receive an amount of movement for operating a surgical instrument(s) 4. The monitor 24 is a display (a display device) of a scope type configured to display an image captured by an endoscope 6. The support arm 25 supports the monitor 24 in such a manner that the height of the monitor 24 is adjusted to the height of the face of the operator. The touch panel 23 is disposed on the support bar 26. When a sensor(s) provided in the vicinity of the monitor 24 detects the head of the operator, the medical manipulator 1 is enabled to be operated by the remote control apparatus 2. The operator operates the manipulator arms 21 and the operation pedals 22, while viewing the surgical site displayed on the monitor 24. With this, the command (instruction) is inputted to the remote control apparatus 2. The command that is inputted to the remote control apparatus 2 is transmitted to the medical manipulator 1.

Figure 5:
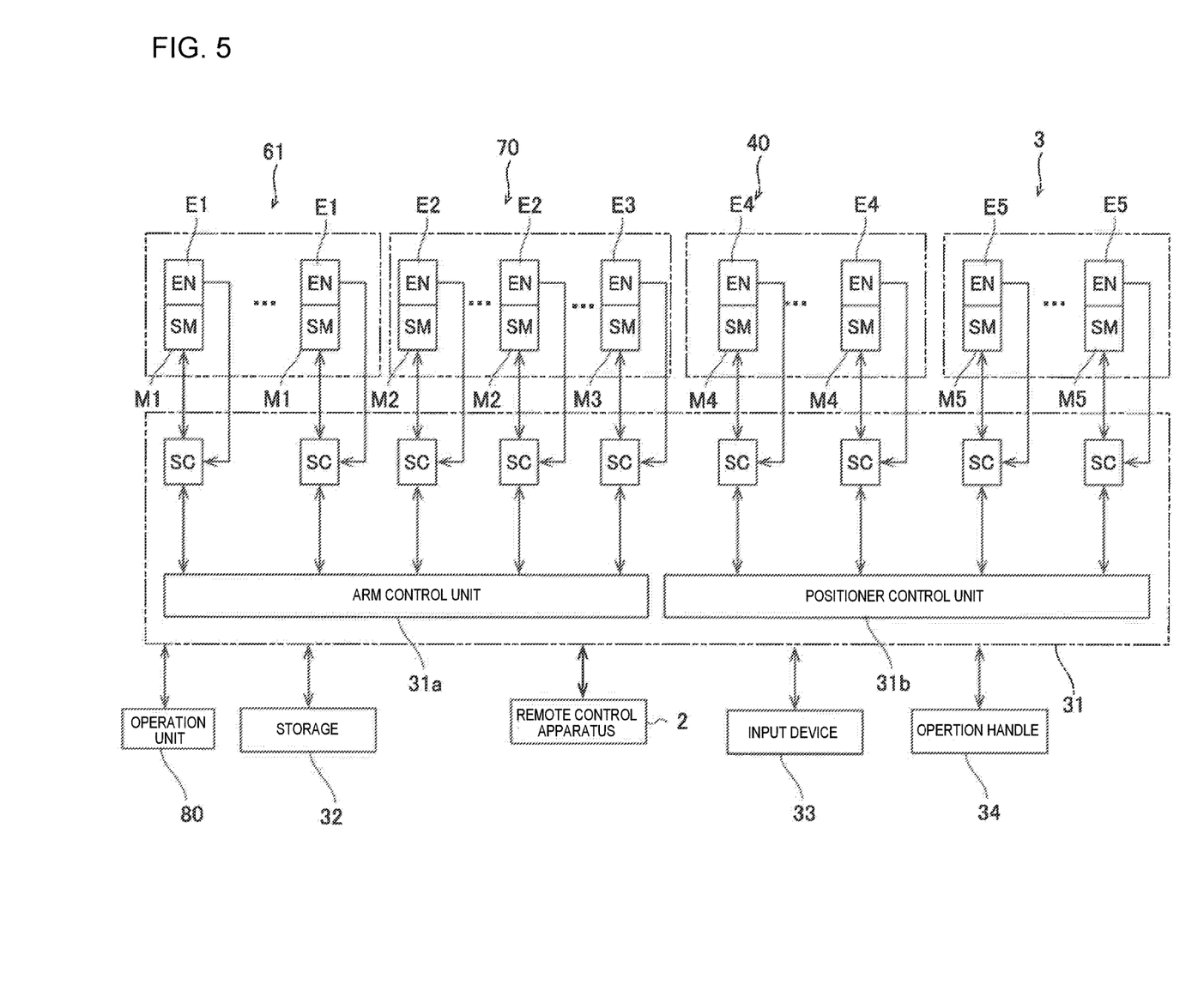
FIG. 5 is a block diagram illustrating a view of a control-related configuration of the surgical system according to an embodiment.

The medical trolley 3 is provided with a control unit 31 (circuitry and/or processor) that controls the operation of the medical manipulator 1 and a storage 32 that stores therein programs for controlling the operation of the medical manipulator 1. Based on the command inputted to the remote control apparatus 2, the control unit 31 of the medical trolley 3 controls the operation of the medical manipulator 1. As illustrated in FIG. 5, the control unit 31 includes an arm control unit 31a and a positioner control unit 31b.

Further, the medical trolley 3 is provided with an input device 33. The input device 33 is configured to accept operations to move or change posture of a positioner 40, an arm base 50, and arms 60, mainly to prepare for surgery before the surgery.

Figure 2:
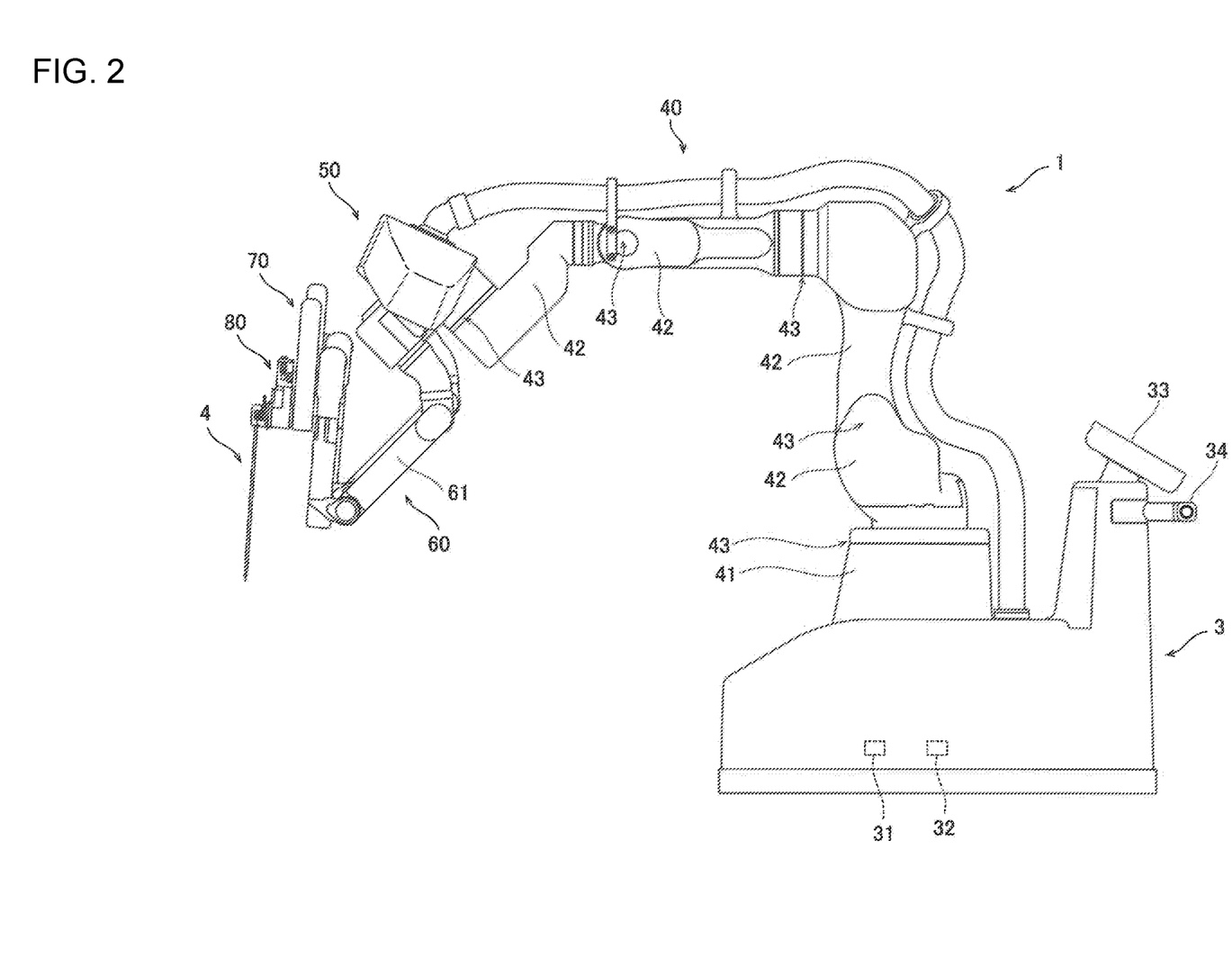
FIG. 2 is a diagram illustrating a view of a configuration of a medical manipulator according to an embodiment.

As illustrated in FIGS. 1 and 2, the medical manipulator 1 is disposed in the surgery room. The medical manipulator 1 includes the medical trolley 3, the positioner 40, the arm base 50, and the arms 60. The arm base 50 is attached to a distal end of the positioner 40. The arm base 50 is a relatively long rod shape (elongate shape). Base portions (proximal end portions) of the arms 60 are attached to the arm base 50. Each of the arms 60 is configured such that the arm 60 is able to take a folded posture (storage posture). The arm base 50 and the arms 60 are used with being covered with a sterile drape. The arm 60 is an example of a "robot arm."

The positioner 40 is configured as a 7-axis articulated robot. The positioner 40 is disposed on the medical trolley 3. The positioner 40 is configured to move the arm base 50. Specifically, the positioner 40 is configured to move the position of the arm base 50 three-dimensionally.

The positioner 40 includes a base portion 41 and link portions 42 connected to the base portion 41. The link portions 42 are connected to each other via joints 43.

As illustrated in FIG. 1, to the distal end of each of the arms 60, the surgical instrument 4 is attached. The surgical instruments 4 include, for example, an instrument, an endoscope 6, and the like that are replaceable.

Next, a configuration of the arm 60 is described in detail.

Figure 3:
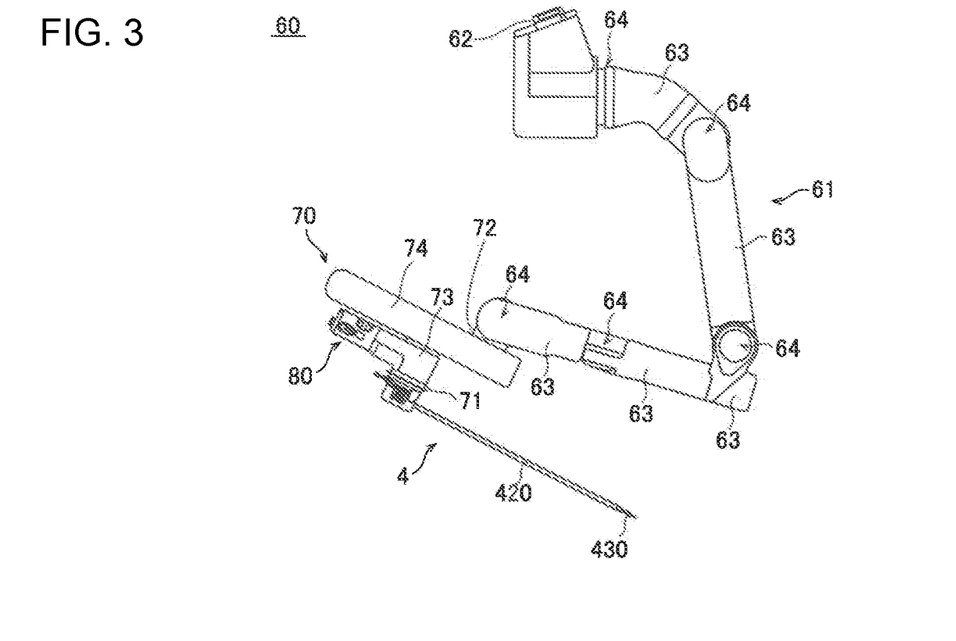
FIG. 3 is a diagram illustrating a view of a configuration of a robot arm of the medical manipulator according to an embodiment.

As illustrated in FIG. 3, the arm 60 includes an arm section 61 (the base portion 62, the link portions 63, the joint portions 64) and a translational movement mechanism 70 provided at the distal end portion of the arm section 61. The arm 60 is configured such that the distal end portion thereof is three-dimensionally movable with respect to the proximal side (the arm base 50) of the arm 60. Each arm 60 has 8 degrees of freedom. The plural arms 60 have the same configuration.

The translational movement mechanism 70 is provided on a side of the distal end of the arm section 61. The surgical instrument 4 is attached to the translational movement mechanism 70. The translational movement mechanism 70 translationally moves the surgical instrument 4 in the insertion direction of the surgical instrument 4 into a patient P. The translational movement mechanism 70 is configured to translationally move the surgical instrument 4 relative to the arm section 61. Specifically, the translational movement mechanism 70 is provided with the holder 71 configured to hold the surgical instrument 4. The holder 71 accommodates therein servo motors M2 (see FIG. 5). The servo motors M2 are configured to rotate rotors (rotation members) provided in the surgical instrument 4. The forceps is operated by rotating the rotors in the surgical instrument 4.

The arm section 61 is configured as a 7-axis articulated robot arm. The arm section 61 includes the base portion 62 that connects the arm section 61 to the arm base 50 and the plural link portions 63 connected to the base portion 62. The plural link portions 63 are connected to each other via the joints 64.

The translational movement mechanism 70 is configured to translationally move the holder 71 along the Y direction so as to translationally move the surgical instrument 4 attached to the holder 71 along the Y direction (the extending direction or the longitudinal direction of the shaft 420). The translational movement mechanism 70 includes a proximal side link unit 72 connected to the distal end of the arm section 61, a distal side link unit 73, and a connecting link unit 74 provided between the proximal side link unit 72 and the distal side link unit 73. The holder 71 is provided at the distal side link unit 73.

The connecting link unit 74 of the translational movement mechanism 70 functions as a double speed mechanism that makes a movement speed of the distal side link unit 73 along the Z direction with respect to the proximal side link unit 72 twice as a movement speed of the proximal side link unit 72 along the Y direction with respect to the connecting link unit 74. The translational movement mechanism 70 is configured to translationally move the surgical instrument 4 attached to the holder 71 along the Y direction by moving the distal side link unit 73 with respect to the proximal side link unit 72 along the Y direction. The distal end of the arm section 61 is configured such that the proximal side link unit 72 is connected thereto in such a manner that the proximal side link unit 72 is rotatable about a rotation axis extending in the X direction orthogonal to the Y direction.

As illustrated in FIG. 1, the endoscope 6 is attached to one of the plural arms 60 (for example, the arm 60b), and the surgical instrument 4 other than the endoscope 6 are attached to the other arms 60 (for example, the arms 60a, 60c, and 60d). Specifically, for surgery, the endoscope 6 is attached to one of the four arms 60, and the surgical instruments 4 (forceps, etc.) other than the endoscope 6 are attached to the other three arms 60. In the state where the endoscope 6 is attached to the arm 60, a pivot position for the endoscope 6 is set to the arm 60 to which the endoscope 6 is attached. Further, in the state where a pivot position setting device (not illustrated) is attached to the arm 60 to which the surgical instrument 4 other than the endoscope 6 is attached, the pivot position for the surgical instrument 4 is set to the arm 60 to which the surgical instrument 4 other than the endoscope 6 is attached. The endoscope 6 is attached to one of two arms 60 (arms 60b and 60c) arranged in the center area among the four arms 60 arranged adjacent to each other. That is, the pivot position is individually set for each of the plurality of arms 60.

Figure 4:
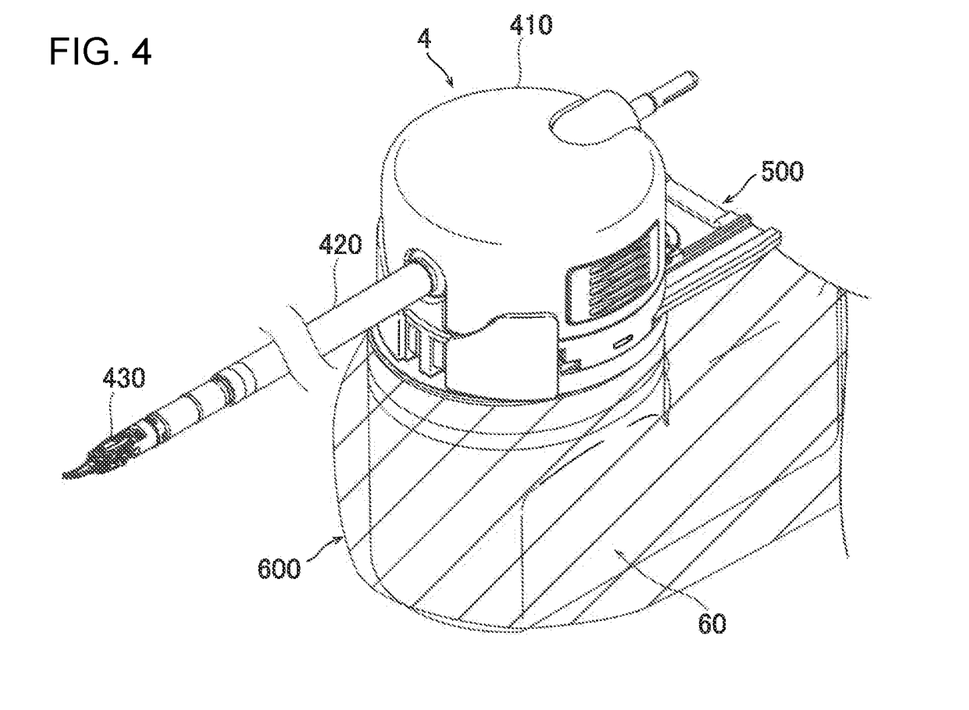
FIG. 4 is a diagram illustrating a perspective view of a state of an embodiment where a surgical instrument is attached to the robot arm through an adaptor.

As illustrated in FIG. 3, the surgical instrument 4 is detachably connected to a holder 71 of the arm 60 of the surgical system 100. Specifically, as illustrated in FIG. 4, the surgical instrument 4 is detachably connected to the arm 60 through the adaptor 500. The adaptor 500 is a drape adaptor configured to sandwich a sterile drape 600 to cover the arm 60, between the adaptor 500 and the holder 71 of the arm 60.

As illustrated in FIG. 4, the surgical instrument 4 includes a base 410, a shaft 420, and an end effector 430. The base 410 is attached to the arm 60. Specifically, the base 410 is attached to the arm 60 via the adaptor 500. A driven unit is provided in the based 410 to operate (drive) the end effector 430. Specifically, the driven unit of the base 410 is provided with a plurality of rotation members. By rotating the rotation members by a drive part provided at the arm 60 via the adaptor 500, the end effector 430 is operated.

Figure 6:
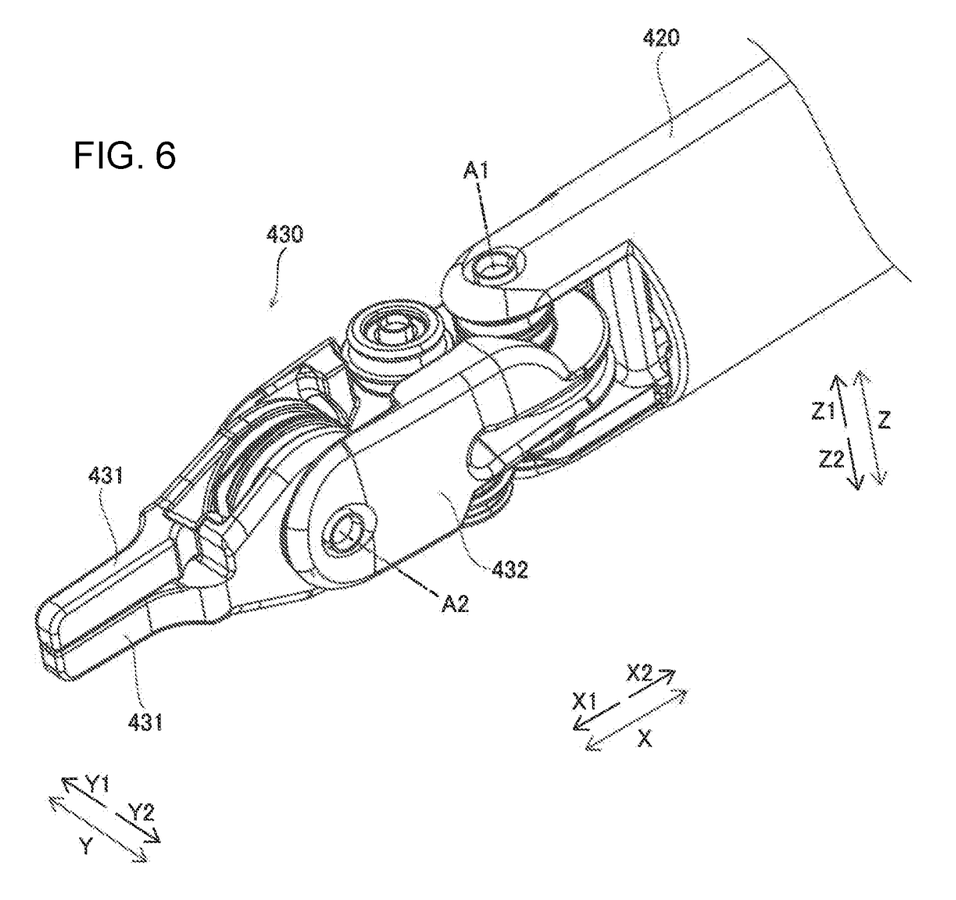
FIG. 6 is a diagram illustrating a perspective view of the end effector of the surgical instrument according to an embodiment.

The shaft 420 includes one end and the other end such that the one end of the shaft 420 is connected to the base 410. Wires are provided in the shaft 420 to transmit the drive of the driven unit to the end effector 430. The end effector 430 is provided at the other end of the shaft 420. As illustrated in FIG. 6, the end effector 430 includes a pair of jaw members 431 and a support member 432 that supports the pair of jaw members 431. The pair of jaw members 431 are rotated about a rotation axis A2 so as to be opened and closed to each other. The pair of jaw members 431 are supported by the support member 432 so as to be rotatable about the rotation axis A2. The support member 432 is connected to the shaft 420 such that the support member 432 is rotatable about a rotation axis A1.

As illustrated in FIG. 5, the arm 60 is provided with a plurality of servomotors M1, a plurality of encoders E1, and a plurality of speed reducers (not illustrated), so as to correspond to the plurality of joints 64 of the arm section 61. The encoder E1 is configured to detect the rotation angle of the servomotor M1. The speed reducer is configured to reduce the rotation of the servomotor M1 to increase the torque.

As illustrated in FIG. 5, the translational movement mechanism 70 includes the servomotors M2 for rotating the rotors (rotation members) provided in the driven unit of the surgical instrument 4, a servomotor M3 for translationally moving the surgical instrument 4, encoders E2, an encoder E3, and speed reducers (not illustrated). The encoders E2 and the encoder E3 are configured to detect the rotation angles of the servomotors M2 and the servomotor M3, respectively. The speed reducers are configured to reduce the rotations of the servomotors M2 and the servomotor M3 to increase the torque thereof. The servomotors M1, M2, and M3 are controlled by the arm control unit 31a.

The positioner 40 is provided with a plurality of servomotors M4, a plurality of encoders E4, and a plurality of speed reducers (not illustrated), so as to correspond to the plurality of joints 43 of the positioner 40. The encoders E4 detect the rotation angles of the servomotors M4. The speed reducers are configured to reduce the rotations of the servomotors M4 to increase the torque thereof.

The medical trolley 3 is provided with servomotors M5 that drive a plurality of front wheels (not illustrated) of the medical trolley 3 respectively, encoders E5, speed reducers (not illustrated), and brakes (not illustrated). The speed reducer is configured to reduce the rotation of the servomotor M5 to increase the torque. An operation handle 34 of the medical trolley 3 is provided with a potentiometer P1. The servomotors M5 for the front wheels are driven based on the rotation angle detected by the potentiometer according to the rotation of the throttle of the operation handle 34. Rear wheels (not illustrated) of the medical trolley 3 are a twin-wheel type and are steered based on the left-right rotation of an operation handle 34. The servomotors M4 and M5 are controlled by the positioner control unit 31b.

Figure 7:
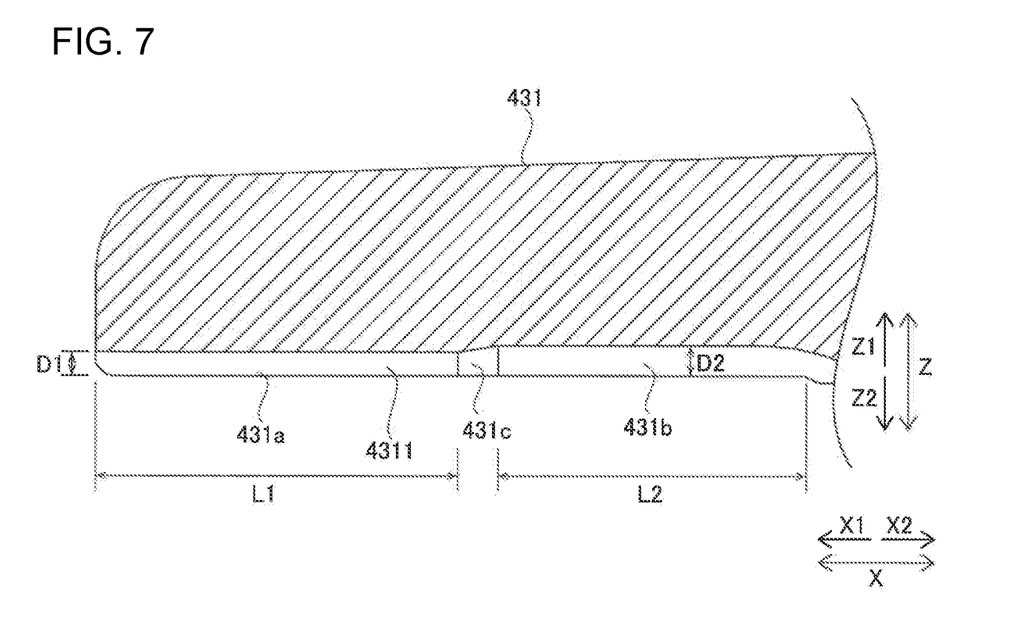
FIG. 7 is a diagram illustrating a sectional view of one of jaw members of the surgical instrument according to an embodiment.
Figure 8:
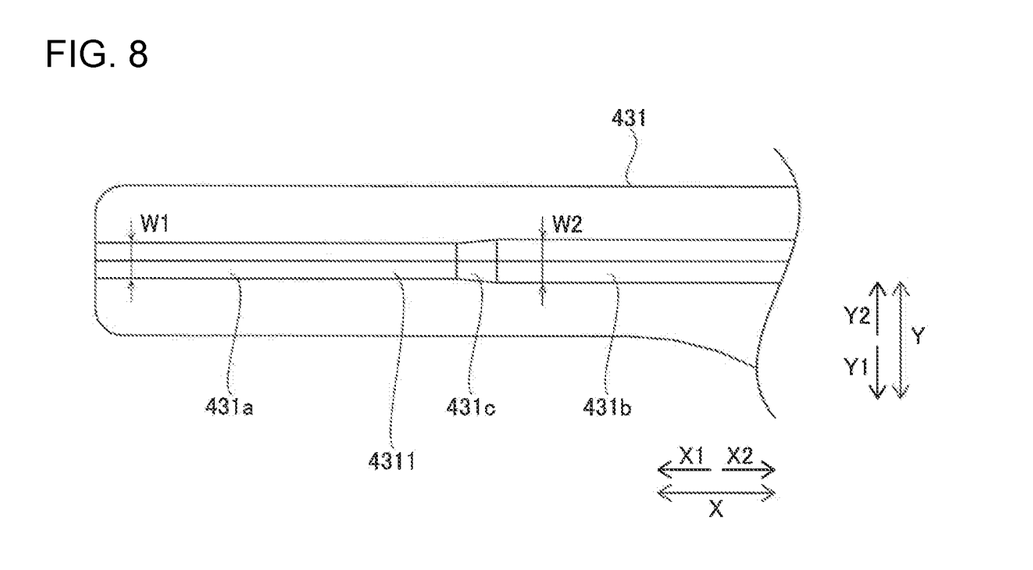
FIG. 8 is a diagram illustrating a bottom view of the jaw members of the surgical instrument according to an embodiment.
Figure 9:
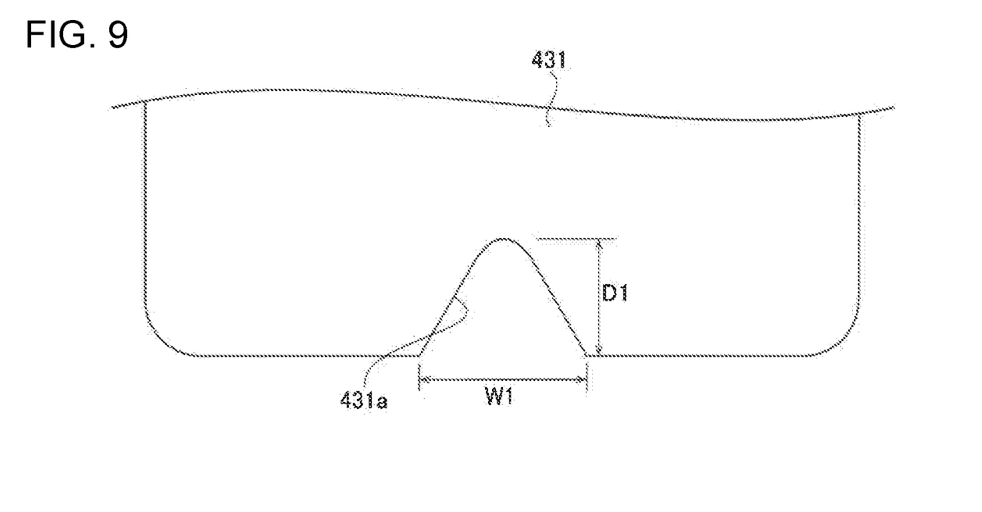
FIG. 9 is a diagram illustrating a sectional view of a first section of the jaw member of the surgical instrument according to an embodiment.

In an embodiment, as illustrated in FIGS. 7 and 8, the surgical instrument 4 is a clip applier that includes, on opposed faces of the pair of jaw members 431 which are opposed to each other, groove-shaped recesses 4311 to retain the clip 200 (see FIG. 9). Each groove-shaped recess 4311 includes a first section 431a provided on a distal end side of the jaw member 431 and having a first depth D1 and a second section 431b provided on a side of the rotation axis A2 of the jaw member 431 with respect to the first section 431a and having a second depth D2 greater than the first depth D1.

Thereby, upon closing the pair of jaw members 431 to collapse the clip 200, the folded portion 220 of the collapsed clip 200 near the rotation axis A2 can be escaped to the second section 431b having the second depth D2 larger than the first depth D1. Accordingly, it is possible to suppress the folded portion 220 of the clip 200 from hindering further closing of the pair of jaw members 431. Thereby, the jaw members 431 can be further closed, so that the clip 200 can be securely closed by the surgical instrument 4 attached to the arm 60. Further, the surgical instrument 4 attached to the arm 60 can easily collapse the clip 200 thoroughly.

For example, in a case where the thickness (the length C2) of clip 200 is approximately 0.38 mm, the first depth D1 is 0.26 mm or more and 0.30 mm or less, and the second depth D2 is 0.31 mm or more and 0.34 mm or less. In a case where the second depth D2 is 0.35 mm or more, the folded portion 220 of the clip 200 cannot be completely collapsed, leaving a gap in the folded portion 220 of the clip 200. In a case where the second depth D2 is less than 0.30 mm, the folded portion 220 cannot be escaped to the second section 431b and thus the jaw members 431 cannot be closed completely, leaving a gap between the folded portion 220 and the distal ends 210 of the clip 200.

Figure 11:
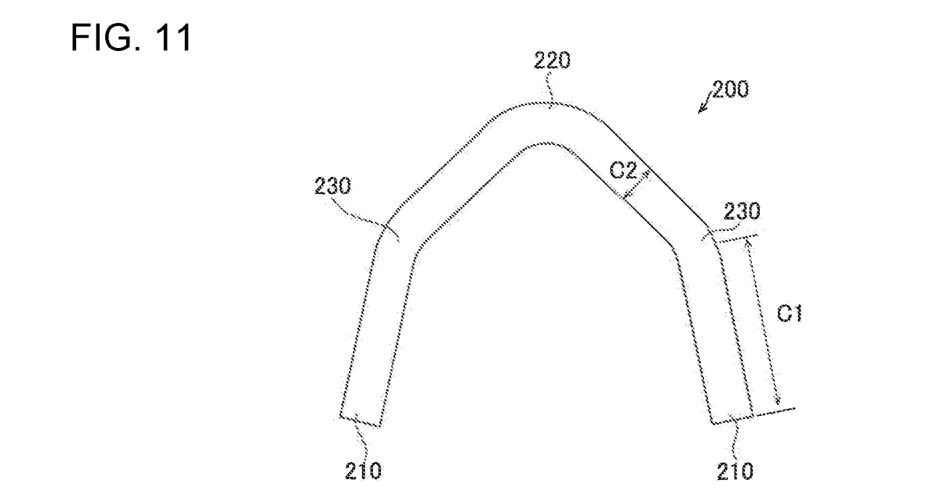
FIG. 11 is a diagram illustrating a view of a clip according to an embodiment.
Figure 12:
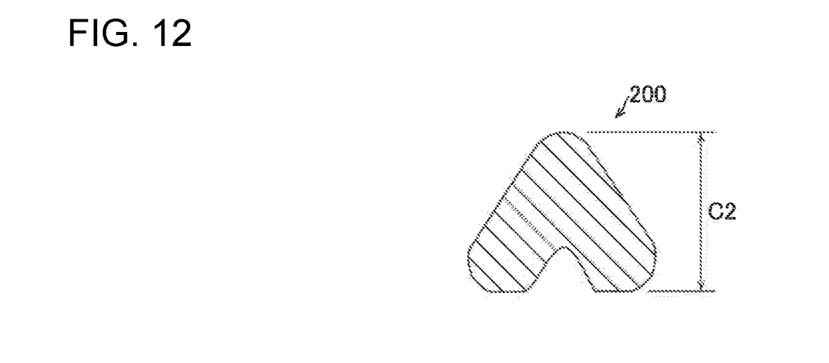
FIG. 12 is a diagram illustrating a sectional view of the clip according to an embodiment.

The clip 200, which is to be sandwiched and collapsed by the pair of jaw members 431, has a substantially U shape before being collapsed, as illustrated in FIG. 11. Specifically, the clip 200 includes the pair of distal ends 210, the folded portion 220 provided at the center between the pair of distal ends 210, and a bend portion 230 provided between each of the distal ends 210 and the folded portion 220. The clip 200 has a length C1 from the distal end 210 to the bend portion 230. As illustrated in FIG. 12, the clip 200 has a substantially triangular shape in the cross-section thereof and a thickness of length C2.

By closing the pair of jaw members 431 while sandwiching the clip 200 (see FIG. 11) having the substantially U-shape with the folded portion 220 at the center thereof, the pair of jaw members 431 deforms the clip 200 to thereby collapse the clip 200. The second section 431b of the recess 4311 is arranged at a position corresponding to the folded portion 220 of the clip 200. Thereby, when the folded portion 220 of the substantially U-shaped clip 200 is collapsed, the collapsed folded portion 220 can be reliably placed in the second section 431b having the large second depth D2.

The recess 4311 of the jaw member 431 includes a connecting section 431c that connects the first section 431a and the second section 431b and gradually changes in depth from the first depth D1 to the second depth D2 from the first section 431a to the second section 431b. Thereby, since the connecting section 431c between the first section 431a and the second section 431b does not have a corner portion due to a step, it is possible to suppress damaging the clip 200 by such a corner.

Further, the first section 431a of the recess 4311 is formed to have a predetermined length extending from the distal end side toward the rotation axis side of the jaw member 431 in such a manner that the bend portion 230 of the clip 200 is in contact with the first section 431a. Specifically, as illustrated in FIG. 7, the length of the first section 431a is L1 in the direction (X direction) from the distal end side to the rotation axis side. The length L1 is larger than the length C1 from the distal end 210 to the bend portion 230 of the clip 200. For example, in a case where the length C1 in the clip 200 is about 1.7 mm, the length L1 of the first section 431a of the jaw member 431 is 2.7 mm in consideration of a mounting error of the clip 200 (e.g., ±0.5 mm). Thereby, the bend portion 230 of the clip 200 can be brought into contact with the first section 431a, and thus the bend portion 230 of the clip 200 can be securely collapsed at the first section 431a having the relatively small first depth D1.

Further, the second section 431b of the recess 4311 has the second depth D2 smaller than the thickness, in the depth direction of the recess 4311, of the clip 200 before deformation. That is, the second depth D2 is smaller than the thickness (length C2) of the clip 200. Thereby, since the depth of the second section 431b is not excessively large, it is possible to suppress an incomplete collapsing of the folded portion 220 of the clip 200 by the second section 431b, that is. It is possible to completely collapse the folded portion 220 of the clip 200 by the second section 431b.

The recess 4311 of the jaw member 431 is formed such that the first depth D1 of the first section 431a is substantially uniform (constant) and the second depth of the second section 431b is substantially uniform (constant). Thereby, the distal ends of the clip 200 can be uniformly collapsed by the first section 431a having the substantially uniform first depth D1. In addition, the folded portion 220 of the clip 200 can be uniformly collapsed by the second section 431b having the substantially uniform second depth D2.

Figure 10:
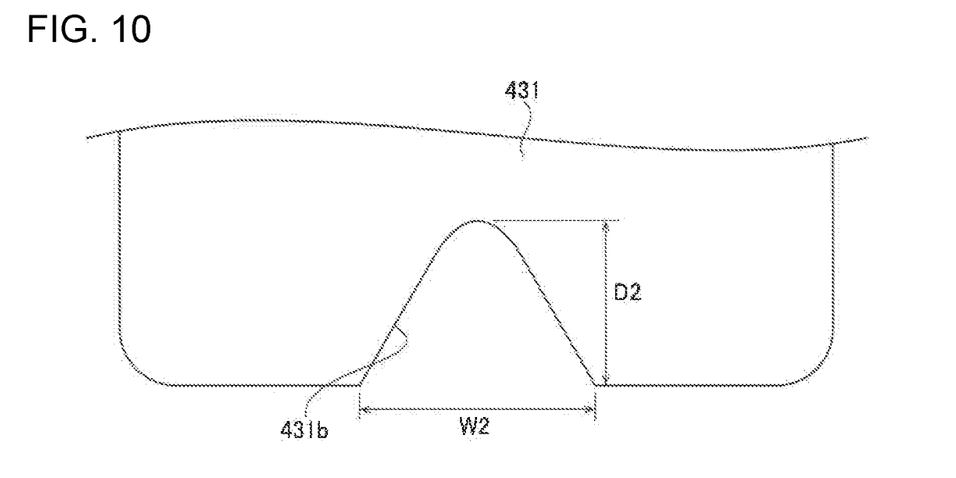
FIG. 10 is a diagram illustrating a sectional view of a second section of the jaw member of the surgical instrument according to an embodiment.

Further, as illustrated in FIGS. 8 to 10, the recess 4311 of the jaw member 431 is formed to include the first section 431a having a first width W1 at an opening end of the recess 4311 and the second section 431b having a second width W2 greater than the first width W1 at the opening end of the recess 4311. Accordingly, it is possible to increase the volume of the second section 431b by increasing the second width W2, which allows the collapsed folded portion 220 to be reliably escaped to the second section 431b.

As illustrated in FIGS. 9 and 10, the recess 4311 (the first section 431a and the second section 431b) of the jaw member 431 has a substantially V-shaped cross section. Accordingly, the clip 200 having the triangular cross-sectional shape can be held by the substantially V-shaped recess 4311 without rattling.

The recess 4311 of the jaw member 431 is formed such that, in a direction (X direction) from the side of the distal end of the jaw member 431 toward a side of the rotation axis of the jaw member 431, the length of the first section 431a is larger than a length of the second section 431b. Specifically, as illustrated in FIG. 7, the length of the first section 431a in the direction (X direction) from the distal end side to the rotation axis side is L1. The length of second section 431b in the X direction is L2. The length L1 is larger than the length L2. Thereby, the clip 200 can be easily collapsed uniformly by the first section 431a having the large length.

Figure 13:
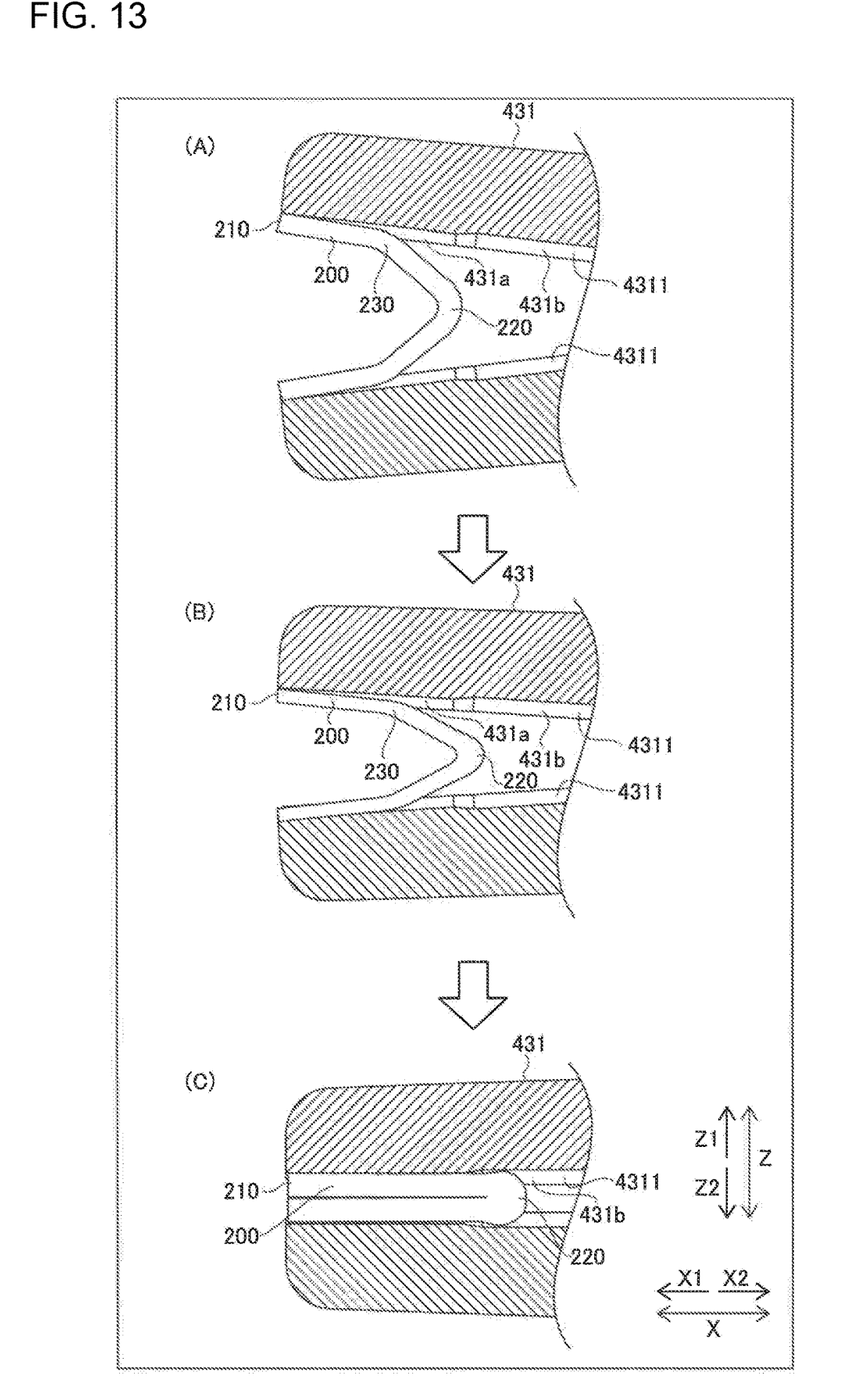
FIG. 13 is a diagram illustrating a view for explaining collapsing operation by the jaw members of the surgical instrument according to an embodiment.

As illustrated in FIG. 13A, the clip 200 is set (loaded) to be sandwiched between the pair of jaw members 431 with the pair of jaw members 431 being opened. The clip 200 is loaded so that the distal ends 210 of the clip 200 are disposed at the distal end position of the jaw members 431. As illustrated in FIG. 13B, in the course of closing the pair of jaw members 431, the clips 200 held in the pair of jaw members 431 is being collapsed. As illustrated in FIG. 13C, the pair of jaw members 431 is further closed. In this operation, since the collapsed folded portion 220 can be escaped to the second section 431b having the larger second depth D2, the pair of jaw members 431 can be further closed. Further, the clip 200 is collapsed and folded entirely from the distal ends 210 to the folded portion 220.

Figure 14:
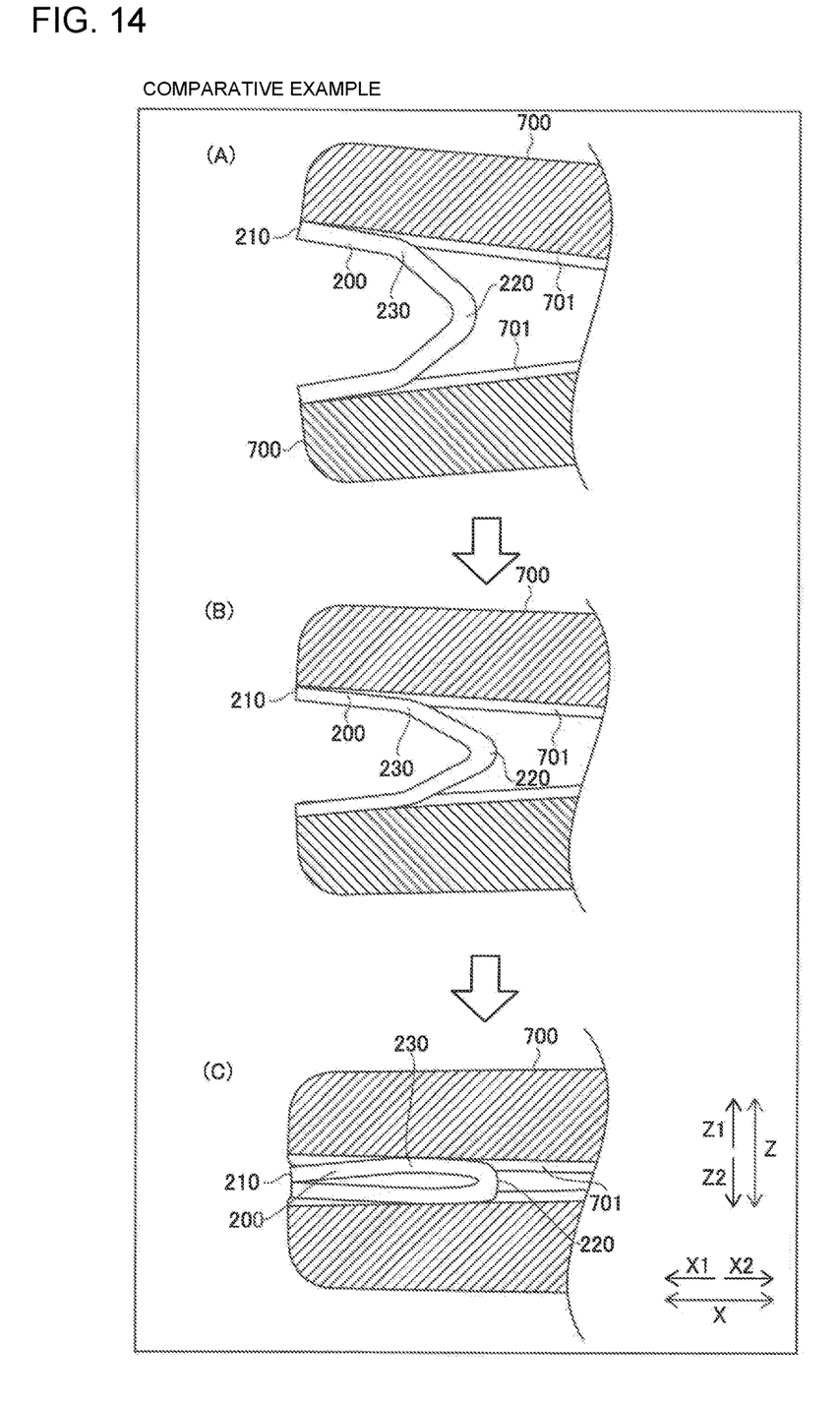
FIG. 14 is a diagram illustrating a view for explaining collapsing operation by jaw members of a surgical instrument according to a comparative example.

On the other hand, unlike an embodiment, a jaw member 700 according to a comparative example illustrated in FIG. 14 includes a groove-shaped recess 701 having a substantially uniform depth. That is, the recess 701 of the jaw member 700 has the substantially uniform depth from an end thereof on the distal end side to an end thereof on the rotation axis side. As illustrated in FIG. 14A, the clip 200 is loaded to be sandwiched between the pair of jaw members 700 with the pair of jaw members 700 being opened. The clip 200 is loaded so that the distal ends 210 of the clip 200 are located at the distal end position of the jaw members 431. As illustrated in FIG. 14B, in the course of closing the pair of jaw members 700, the clips 200 held in the pair of jaw members 700 is being collapsed. As illustrated in FIG. 14C, when an attempt is made to further close the pair of jaw members 700, the collapsed folded portion 220 interferes with the jaw members 700 at the recess 701. For this reason, the jaw members 700 cannot be further closed, leaving a gap around the bend portion 230 in the clip 200. For this reason, the clip 200 cannot be completely closed.

Effects of One or More Embodiments

According to one or more embodiments, effects as described below can be obtained.

In an embodiment described above, the recess 4311 of the jaw member 431 includes the first section 431a provided on the side of the distal end of the jaw member 431 and having the first depth D1 and the second section 431b provided on the side of the rotation axis A2 of the jaw member 431 with respect to the first section 431a and having the second depth D2 greater than the first depth D1. Accordingly, upon closing the pair of jaw members 431 to collapse the clip 200, the folded portion 220 of the collapsed clip 200 near the rotation axis A2 can be escaped to the second section 431b having the second depth D2 larger than the first depth D1. Accordingly, it is possible to suppress the folded portion 220 of the clip 200 from hindering further closing of the pair of jaw members 431. Therefore, the jaw members 431 can be further closed, so that the clip 200 can be securely closed by the surgical instrument 4 attached to the arm 60. Further, the clip 200 can be easily collapsed thoroughly by the surgical instrument 4 attached to the arm 60.

Modifications

Note that one or more embodiments disclosed herein should be considered as exemplary in all respects and do not limit the invention. The scope of the invention is indicated by claims, not by explanation of one or more embodiments described above, and includes equivalents to the claims and all alterations (modification) within the same.

For example, in one or more embodiments described above, the case has been described in which the groove-shaped recess of the jaw member has the substantially V-shaped cross section. However, the invention is not limited thereto. In the disclosure, the cross-section of the groove-shaped recess of the jaw member may have a substantially rectangular shape, a substantially semicircular shape, a substantially polygonal shape, or the like.

Further in one or more embodiments described above, the case has been described in which one clip is loaded to the surgical instrument. However, the invention is not limited thereto. In the disclosure, two or more clips may be loaded to a surgical instrument and then used sequentially.

In one or more embodiments described above, the case has been described in which the number of the arms provided is four. However, the invention is not limited thereto. In the disclosure, the number of the arms may be any number as long as at least one is provided.

In one or more embodiments described above, the case has been described in which each of the arm section and the positioner is configured as the 7-axis articulated robot. However, the invention is not limited thereto. For example, the arm and/or the positioner may be configured as an articulated robot other than the 7-axis articulated robot (for example, a 6-axis articulated robot, an 8-axis articulated robot, or the like).

Further, in one or more embodiments described above, the case has been described in which the medical manipulator includes the medical trolley, the positioner, the arm base, and the arms. However, the invention is not limited thereto. For example, the medical manipulator may include only the arms and not include the medical trolley, the positioner, and the arm base.

The functions of each of the elements disclosed herein may be carried out by a circuitry or a processing circuitry including a general purpose processor, a dedicated processor, an integrated circuit, an ASIC (Application Special Integrated Circuit), a conventional circuit, or a combination of two or more of them, that is configured or programmed to perform the functions. A processor is considered a processing circuitry or a circuitry because it contains transistors and other circuit elements. In the disclosure, a circuit, a unit, or a means may be either a hardware that is configured to perform the recited function(s) or a hardware that is programmed to perform the recited function(s). The hardware may be the hardware disclosed herein, or may be other known hardware that is programmed or configured to perform the function(s) described. If the hardware is a processor which is considered as a type of a circuit, a circuit, a means, or a unit is a combination of hardware and software, and the software is used to configure the hardware and/or the processor.

ASPECTS

It will be appreciated by those skilled in the art that exemplary embodiments described above may be specific examples of the following aspects.

Item 1

A surgical instrument comprising:
a base to be attached to a robot arm;
a shaft including one end connected to the base; and
a pair of jaw members provided to the other end of the shaft and provided to be rotatable about a first rotation axis so as to be opened and closed to each other, wherein
opposing surfaces of the pair of jaw members include groove-shaped recesses, respectively, to hold a clip, and
the recess of each of the jaw members includes a first section provided on a side of a distal end of the jaw member and having a first depth and a second section provided on a side of a first rotation axis of the jaw member with respect to the first section and having a second depth greater than the first depth.

Item 2

The surgical instrument according to Item 1, wherein
the pair of jaw members are configured to deform the clip to collapse the clip by closing while sandwiching the clip, the clip having a substantially U-shape with a folded portion at a center thereof, and
the second section of the recess is provided at a position corresponding to the folded portion of the clip.

Item 3

The surgical instrument according to Item 2, wherein
the clip includes a bend portion between the folded portion and each of distal ends of the clip, and
the first section of the recess has a predetermined length from the side of the distal end of the jaw member toward the side of the first rotation axis of the jaw member such that the bend portion of the clip comes in contact with the first section of the recess.

Item 4

The surgical instrument according to any one of Items 1 to 3, wherein
the second section of the recess has the second depth smaller than a thickness, in a depth direction of the recess, of the clip before deformation of the clip.

Item 5

The surgical instrument according to any one of Items 1 to 4, wherein
the recess of the jaw member is provided such that the first depth of the first section is substantially uniform and the second depth of the second section is substantially uniform.

Item 6

The surgical instrument according to any one of Items 1 to 5, wherein
the recess of the jaw member further includes a connecting portion that connects the first section and the second section and gradually changes in depth from the first depth to the second depth in a direction from the first section toward the second section.

Item 7

The surgical instrument according to any one of Items 1 to 6, wherein
The surgical instrument according to Item 1, wherein
the first section of the recess of the jaw member has a first width at an opening end of the recess and the second section of the recess has a second width greater than the first width at the opening end of the recess.

Item 8

The surgical instrument according to any one of Items 1 to 7, wherein the recess of the jaw member is provided such that a length of the first section is larger than a length of the second section in a direction from the side of the distal end of the jaw member toward the side of the first rotation axis.

Item 9

The surgical instrument according to any one of Items 1 to 8, wherein
the recess of the jaw member has a substantially V-shape in a cross-section thereof.

Item 10

The surgical instrument according to any one of Items 1 to 9, further comprising
a support member that supports the pair of jaw members to be rotatable about the first rotation axis, wherein
the shaft supports the support member to be rotatable about a second rotation axis.

Item 11

A surgical instrument comprising:
a base to be attached to a robot arm;
a shaft including one end connected to the base; and
a first jaw member and a second jaw member which are provided to the other end of the shaft and provided to be rotatable about a first rotation axis so as to be opened and closed to each other, wherein
an opposing surface of the first jaw member opposed to the second jaw member includes a groove-shaped first recess to hold a clip,
an opposing surface of the second jaw member opposed to the first jaw member includes a groove-shaped second recess to hold the clip,
the first recess includes a first section provided on a side of a distal end of the first jaw member and having a first depth and a second section provided on a side of a first rotation axis of the first jaw member with respect to the first section and having a second depth greater than the first depth, and
the second recess includes a third section provided on a side of a distal end of the second jaw member and having a third depth and a fourth section provided on a side of the first rotation axis of the second jaw member with respect to the third section and having a fourth depth greater than the third depth.

Item 12

The surgical instrument according to Item 11, wherein
the first and second jaw members are configured to deform the clip to collapse the clip by closing while sandwiching the clip, the clip having a substantially U-shape with a folded portion at a center of the clip, and the second section of the first recess and the fourth section of the second recess are provided at positions corresponding to the folded portion of the clip.

Item 13

The surgical instrument according to Item 12, wherein
the clip includes a first bend portion between the folded portion and a first distal end of the clip and a second bend portion between the folded portion and a second distal end of the clip,
the first section of the first recess has a predetermined length from the side of the distal end of the first jaw member to the side of the first rotation axis such that the first bend portion of the clip comes in contact with the first section of the first recess, and
the third section of the second recess has a predetermined length from the side of the distal end of the second jaw member toward the side of the first rotation axis such that the second bend portion of the clip comes in contact with the third section of the second recess.

Item 14

The surgical instrument according to any one of Items 11 to 13, wherein
the second section of the first recess has the second depth smaller than a thickness of the clip before deformation of the clip, and
the fourth section of the second recess has the fourth depth smaller than the thickness of the clip before deformation of the clip.

Item 15

The surgical instrument according to any one of Items 11 to 14, wherein
the recess of the jaw member is provided such that the first depth of the first section is substantially uniform and the second depth of the second section is substantially uniform.

Item 16

The surgical instrument according to Item 11, wherein
the first recess of the first jaw member further includes a first connecting portion that connects the first section and the second section and gradually changes in depth from the first depth to the second depth in a direction from the first section toward the second section, and
the second recess of the second jaw member further includes a second connecting portion that connects the third section and the fourth section and gradually changes in depth from the third depth to the fourth depth in a direction from the third section toward the fourth section.

Item 17

The surgical instrument according to any one of Items 11 to 16, wherein
at an opening end of the first recess of the first jaw member, the first section has a first width and the second section has a second width greater than the first width, and at an opening end of the second recess of the second jaw member, the third section has a third width and the fourth section has a fourth width greater than the third width.

Item 18

The surgical instrument according to any one of Items 11 to 17, wherein
the first recess of the first jaw member is provided such that, in a direction from the side of the distal end of the first jaw member toward the side of the first rotation axis, a length of the first section is larger than a length of the second section, and
the second recess of the second jaw member is provided such that, in a direction from the side of the distal end of the second jaw member toward the side of the first rotation axis, a length of the third section is larger than a length of the fourth section.

Item 19

A surgery assist robot comprising:
a robot arm; and
a surgical instrument to be attached to a robot arm, wherein
the surgical instrument comprises:
a base to be attached to the robot arm;
a shaft including one end connected to the base;
a pair of jaw members provided to the other end of the shaft and provided to be rotatable about a rotation axis so as to be opened and closed to each other; and
opposing surfaces of the pair of jaw members include groove-shaped recesses, respectively, to hold a clip, wherein
the recess of each of the jaw members includes a first section provided on a side of a distal end of the jaw member and having a first depth and a second section provided on a side of the rotation axis of the jaw member with respect to the first section and having a second depth greater than the first depth.

Item 20

The surgery assist robot according to Item 19, wherein
the robot arm includes a holder to which the base is attached, and the holder includes a motor configured to drive the surgical instrument.

The invention includes other embodiments or modifications in addition to one or more embodiments and modifications described above without departing from the spirit of the invention. The one or more embodiments and modifications described herein are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:
1. A surgical instrument comprising:
a base to be attached to a robot arm;
a shaft including one end connected to the base; and
a pair of jaw members provided to the other end of the shaft and provided to be rotatable about a first rotation axis so as to be opened and closed to each other, wherein opposing surfaces of the pair of jaw members include groove-shaped recesses, respectively, to hold a clip, the recess of each of the jaw members includes; a first section provided on a side of a distal end of the jaw member, extending to a distal edge of the jaw member, and having a first depth; a second section provided on a side of the first rotation axis of the jaw member with respect to the first section and having a second depth greater than the first depth; and a connecting portion provided between and connecting the first section and the second section, the first depth of the first section is substantially uniform and the second depth of the second section is substantially uniform, and a depth of the connecting portion gradually changes from the first depth to the second depth in a direction from the first section toward the second section.

2. The surgical instrument according to claim 1, wherein the pair of jaw members are configured to deform the clip to collapse the clip by closing while sandwiching the clip, the clip having a substantially U-shape with a folded portion at a center thereof, and the second section of the recess is provided at a position corresponding to the folded portion of the clip.

3. The surgical instrument according to claim 2, wherein the clip includes a bend portion between the folded portion and each of distal ends of the clip, and the first section of the recess has a predetermined length from the side of the distal end of the jaw member toward the side of the first rotation axis of the jaw member such that the bend portion of the clip comes in contact with the first section of the recess.

4. The surgical instrument according to claim 1, wherein the second section of the recess has the second depth smaller than a thickness, in a depth direction of the recess, of the clip before deformation of the clip.

5. The surgical instrument according to claim 1, wherein the recess of the jaw member is provided such that a length of the first section is larger than a length of the second section in a direction from the side of the distal end of the jaw member toward the side of the first rotation axis.

6. The surgical instrument according to claim 1, wherein each of the first section, the connecting portion, and the second section of the recess of the jaw member has a substantially V-shape in a cross-section thereof.

7. The surgical instrument according to claim 1, further comprising a support member that supports the pair of jaw members to be rotatable about the first rotation axis, wherein the shaft supports the support member to be rotatable about a second rotation axis.

8. The surgical instrument according to claim 1, wherein the first section has a first width and the second section has a second width greater than the first width, and the first width of the first section is substantially uniform and the second width of the second section is substantially uniform, such that the connecting portion gradually changes in width from the first width to the second width in the direction from the first section toward the second section.

9. A surgical instrument comprising:
a base to be attached to a robot arm;
a shaft including one end connected to the base; and
a first jaw member and a second jaw member which are provided to the other end of the shaft and provided to be rotatable about a first rotation axis so as to be opened and closed to each other, wherein an opposing surface of the first jaw member opposed to the second jaw member includes a groove-shaped first recess to hold a clip, an opposing surface of the second jaw member opposed to the first jaw member includes a groove-shaped second recess to hold the clip, the first recess includes a first section provided on a side of a distal end of the first jaw member, extending to a distal edge of the first jaw member, and having a first depth; a second section provided on a side of the first rotation axis of the first jaw member with respect to the first section and having a second depth greater than the first depth; and a first connecting portion provided between and connecting the first section and the second section, the first depth of the first section is substantially uniform and the second depth of the second section is substantially uniform, a depth of the connecting portion gradually changes from the first depth to the second depth in a direction from the first section toward the second section, the second recess includes; a third section provided on a side of a distal end of the second jaw member, extending to the distal edge of the second jaw member, and having a third depth; a fourth section provided on a side of the first rotation axis of the second jaw member with respect to the third section and having a fourth depth greater than the third depth; and a second connecting portion provided between and connecting the third section and the fourth section, the third depth of the third section is substantially uniform and the fourth depth of the fourth section is substantially uniform, and a depth of the second connecting portion gradually changes from the third depth to the fourth depth in a direction from the third section toward the fourth section.

10. The surgical instrument according to claim 9, wherein the first and second jaw members are configured to deform the clip to collapse the clip by closing while sandwiching the clip, the clip having a substantially U-shape with a folded portion at a center of the clip, and the second section of the first recess and the fourth section of the second recess are provided at positions corresponding to the folded portion of the clip.

11. The surgical instrument according to claim 10, wherein the clip includes a first bend portion between the folded portion and a first distal end of the clip and a second bend portion between the folded portion and a second distal end of the clip, the first section of the first recess has a predetermined length from the side of the distal end of the first jaw member to the side of the first rotation axis such that the first bend portion of the clip comes in contact with the first section of the first recess, and the third section of the second recess has a predetermined length from the side of the distal end of the second jaw member toward the side of the first rotation axis such that the second bend portion of the clip comes in contact with the third section of the second recess.

12. The surgical instrument according to claim 9, wherein
the second section of the first recess has the second depth smaller than a thickness of the clip before deformation of the clip, and
the fourth section of the second recess has the fourth depth smaller than the thickness of the clip before deformation of the clip.

13. The surgical instrument according to claim 9, wherein
the first recess of the first jaw member is provided such that, in a direction from the side of the distal end of the first jaw member toward the side of the first rotation axis, a length of the first section is larger than a length of the second section, and
the second recess of the second jaw member is provided such that, in a direction from the side of the distal end of the second jaw member toward the side of the first rotation axis, a length of the third section is larger than a length of the fourth section.

14. The surgical instrument according to claim 9, wherein
the first section has a first width and the second section has a second width greater than the first width,
the first width of the first section is substantially uniform and the second width of the second section is substantially uniform, such that the connecting portion gradually changes in width from the first width to the second width in the direction from the first section toward the second section,
the third section has a third width and the fourth section has a fourth width greater than the third width, and
the third width of the third section is substantially uniform and the fourth width of the fourth section is substantially uniform, such that the connecting portion gradually changes in width from the third width to the fourth width in the direction from the third section toward the fourth section.

15. A surgery assist robot comprising:
a robot arm; and
a surgical instrument to be attached to the robot arm, wherein
the surgical instrument comprises:
a base to be attached to the robot arm;
a shaft including one end connected to the base;
a pair of jaw members provided to the other end of the shaft and provided to be rotatable about a rotation axis so as to be opened and closed to each other; and
opposing surfaces of the pair of jaw members include groove-shaped recesses, respectively, to hold a clip, wherein
the recess of each of the jaw members includes; a first section provided on a side of a distal end of the jaw member, extending to a distal edge of the jaw member, and having a first depth; a second section provided on a side of the rotation axis of the jaw member with respect to the first section and having a second depth greater than the first depth; and a connecting portion provided between and connecting the first section and the second section,
the first depth of the first section is substantially uniform and the second depth of the second section is substantially uniform, and
a depth of the connecting portion gradually changes from the first depth to the second depth in a direction from the first section toward the second section.

16. The surgery assist robot according to claim 15, wherein
the robot arm includes a holder to which the base is attached, and the holder includes a motor configured to drive the surgical instrument.

17. The surgical instrument according to claim 15, wherein
the first section has a first width and the second section has a second width greater than the first width, and
the first width of the first section is substantially uniform and the second width of the second section is substantially uniform, such that the connecting portion gradually changes in width from the first width to the second width in the direction from the first section toward the second section.

* * * * *